United States Patent
Guri et al.

(10) Patent No.: US 10,296,740 B2
(45) Date of Patent: *May 21, 2019

(54) SYSTEM AND METHOD FOR DETECTING ACTIVITIES WITHIN A BOOTSTRAP OF A COMPUTERIZED DEVICE BASED ON MONITORING OF POWER CONSUMPTION

(71) Applicant: B.G. NEGEV TECHNOLOGIES AND APPLICATIONS LTD., AT BEN-GURION UNIVERSITY, Beer Sheva (IL)

(72) Inventors: Mordechai Guri, Modi'in (IL); Yuval Elovici, Lachish (IL)

(73) Assignee: B.G. Negev Technologies and Application Ltd., at Ben-Gurion University, Beer Sheva (IL)

( * ) Notice: Subject to any disclaimer, the term of this patent is extended or adjusted under 35 U.S.C. 154(b) by 270 days.

This patent is subject to a terminal disclaimer.

(21) Appl. No.: 15/309,477

(22) PCT Filed: May 13, 2015

(86) PCT No.: PCT/IL2015/050506
§ 371 (c)(1),
(2) Date: Nov. 8, 2016

(87) PCT Pub. No.: WO2015/177783
PCT Pub. Date: Nov. 26, 2015

(65) Prior Publication Data
US 2017/0185770 A1    Jun. 29, 2017

Related U.S. Application Data

(60) Provisional application No. 61/994,897, filed on May 18, 2014.

(51) Int. Cl.
*G06F 21/55* (2013.01)
*G06F 21/57* (2013.01)
(Continued)

(52) U.S. Cl.
CPC .......... *G06F 21/554* (2013.01); *G06F 21/575* (2013.01); *G06F 21/755* (2017.08);
(Continued)

(58) Field of Classification Search
CPC ...... G06F 21/575; G06F 21/81; G06F 9/4401; G06F 9/4406; G06F 21/554; G06F 21/558; G06F 21/755; G06F 2221/034
See application file for complete search history.

(56) References Cited

U.S. PATENT DOCUMENTS

| 7,184,905 B2 | 2/2007 | Stefan | |
| 2008/0276111 A1* | 11/2008 | Jacoby | G06F 21/55 713/340 |

(Continued)

FOREIGN PATENT DOCUMENTS

WO    2015/145425 A1    1/2015

OTHER PUBLICATIONS

International Search Report for PCT/IL2015/050506, dated Sep. 7, 2015 (3 pages).

(Continued)

*Primary Examiner* — Terrell S Johnson
(74) *Attorney, Agent, or Firm* — Roach Brown McCarthy & Gruber, P.C.; Kevin D. McCarthy (57) ABSTRACT

The invention relates to a system for protecting a computerized device from activities within the device bootstrap, which comprises: (a) a DC supply monitoring unit for monitoring power consumption of the DC supply of the device during bootstrap; and (b) a database for storing one or more valid bootstrap signatures, each of said valid boot- (Continued)

strap signatures describes a valid variation of power consumption pattern, respectively, from the DC supply of the device; wherein, during bootstrapping of the device, said DC supply monitoring unit continuously monitors the power consumption from said DC supply of the device, compares characteristics of the power consumption with said one or more valid bootstrap signatures in said database, and alerts upon detection of a mismatch.

19 Claims, 6 Drawing Sheets

(51) Int. Cl.
　　*G06F 21/75*　　　(2013.01)
　　*G06F 21/81*　　　(2013.01)
　　*G06F 9/4401*　　(2018.01)
(52) U.S. Cl.
　　CPC ............ *G06F 21/81* (2013.01); *G06F 9/4401* (2013.01); *G06F 9/4406* (2013.01); *G06F 2221/034* (2013.01)

(56) References Cited

U.S. PATENT DOCUMENTS

| | | | |
|---|---|---|---|
| 2010/0070800 A1* | 3/2010 | Hanna | G06F 21/575 714/6.12 |
| 2010/0313270 A1 | 12/2010 | Kim | |
| 2012/0180126 A1 | 7/2012 | Liu et al. | |
| 2013/0013906 A1* | 1/2013 | Brown | G06F 21/575 713/2 |
| 2013/0047144 A1* | 2/2013 | Chalmers | G06F 8/654 717/168 |
| 2013/0110423 A1 | 5/2013 | Zimmermann | |
| 2013/0117006 A1* | 5/2013 | Varghese | G06F 21/53 703/22 |
| 2013/0318607 A1 | 11/2013 | Reed et al. | |

OTHER PUBLICATIONS

Written Opinion of the International Searching Authority for PCT/IL2015/050506, dated Sep. 7, 2015 (4 pages).
International Preliminary Report on Patentability for PCT/IL2015/050506, dated Nov. 22, 2016 (4 pages).

* cited by examiner

SYSTEM AND METHOD FOR DETECTING ACTIVITIES WITHIN A BOOTSTRAP OF A COMPUTERIZED DEVICE BASED ON MONITORING OF POWER CONSUMPTION

FIELD OF INVENTION

The field of the invention relates in general to methods and systems for securing computerized environments and devices. More specifically, the invention relates to a method and a system for detecting a manipulation of a bootstrap of a computerized device, based on monitoring of the power consumption of the DC supply of the device.

BACKGROUND OF THE INVENTION

Computerized devices, either stationary or mobile, are valuable targets for skillful, sophisticated, and motivated offenders.

Stationary computers are widely used for communicating and storing sensitive data, and are also widely used for controlling the operation of essential infrastructures, such as electrical turbines, water supply systems, railroads signaling, operation and control of vehicles, and various other tasks. Various of protection techniques have been developed to protect said stationary devices from malicious code, as any disturbance to their operation may result in a very significant damage.

The above mentioned security problem is also acute with respect to mobile devices. Modern mobile devices host various gadgets and sensors, such as GPS, Wi-Fi, voice, camera, accelerometers, etc. An unauthorized intrusion which introduces a malicious code may activate one or more of said sensitive component without the user's consent. This serious vulnerability is exploited by remote, hostile agents to gather sensitive information through the subverted mobile phone. For this purpose, and in similarity to stationary devices, a variety of security software has been developed and is widely used for protecting mobile devices. It should be noted, however, that the security model of most mobile phone operating systems discourages some typical monitoring solutions that are available for stationary devices.

In computer technology, the term "bootstrapping" (usually shortened to "booting") usually refers to the process of loading the basic software into the memory of a computer after power-on or general reset, especially the operating system which will then take care of loading other software as needed. The bootstrap code, which is typically stored within a flash memory on the device, is considered by hackers as an attractive target for injecting malicious code to the operating system, as the bootstrap in fact initiates many pieces of genuine codes that are then used during the entire operation of the device.

As noted, a variety of security software has been developed and is widely used for protecting stationary and mobile devices. However, the fact that most of the security mechanisms execute within the same memory domain of which it is supposed to protect from malicious activities, exposes the security code itself to malicious manipulations.

One alternative solution for protecting a mobile phone from a malicious code is disclosed, for example, by Zefferer et. al. Zefferer proves that a malware running within the mobile phone has a unique characteristic "signature", therefore various malware can be detected by means of monitoring the power consumption of the battery. More specifically, Zefferer suggests monitoring of the power consumption of the phone's battery to detect anomalies that may hint to a malicious activity by a running code. This solution is based on said assumption that a variety of malicious activities within the protected environment have characteristic and detectable behaviors, respectively, in terms of power consumption of the battery. More specifically, each of said malicious activities has its own "signature". This solution in fact suggests performing a continuous monitoring of the power consumption from the battery of the telephone, and detection of such "signature". Sometimes, the detection of this behavior involves a combined monitoring of the battery and one or more additional elements (such as the microphone, the camera, the WiFi, etc.). Still in some additional cases, and in a manner common in the field of computer security, this detection technique is used in association with other protection techniques. However, according to all of the prior art publications, said monitoring of the device battery, and optionally one or more additional sensors, is performed by a program that runs within the same computerized environment that it intends to protect.

The term "environment", or "computerized environment" relates herein to a range of hardware and software, that are in turn accessible either physically (for example, via a USB connector) or wirelessly (for example, via a WiFi network). Typically an "environment" is a close computerized range to which access is allowed only to authorized persons or programs, however, a "closed" environment may be breached by unauthorized activities, either via said physical connection or wirelessly.

As noted, a variety of software tools have been developed to protect a computerized environment (i.e., either stationary computers or mobile devices), from malicious programs and activities. Substantially all of the security software tools, no matter what measures they apply, have one characteristic in common: They all run a protection code on the device (stationary or mobile) or network of devices that they intend to protect, i.e., they run within the same environment that they intend to protect. For example, the anti-virus tool executes a program that runs within the device to scan the one or more hard disks and the device memory. The firewall, in turn, runs a program within the internal computerized environment that masks the structure of the environment of the world outside of this environment.

As noted above, this manner of operation, however, has a significant drawback. The fact that a malicious code has successfully injected to within the protected environment is in itself a proof for the vulnerability of this environment. As a result of this vulnerability, and by the same manner that the malicious code was successfully injected to within the protected environment, a same or another code may, for example, manipulate the protecting code (for example, anti-virus, or any other protecting software) to perform one of the following: (i) to terminate its operation; (ii) to cause it to ignore the existence of the malicious code within the protected environment; or (iii) to manipulate the protecting code such that no report will be issued to the user with respect to the detection of the malicious code. Following this manipulation, the malicious code in fact can operate freely within the protected environment.

PCT/IL2015/050297, by the same applicants as of the present application, discloses a "System and Method For Detecting Activities Within a Computerized Device Based on Monitoring of its Power Consumption". More specifically, this application discloses a security software for detecting malicious activities within a computerized environment, which comprises a monitoring circuit which is in turn entirely isolated from the computerized environment of the device, while it is still connected to the DC supply of the device, and it determines malicious activities by means of monitoring power consumption from the DC supply.

PCT/IL2015/050297, however, teaches the detection of malicious programs while they are running within the environment of the protected device. It does not provide any manner by which the initiation of such malicious programs during bootstrap can be detected, nor any manner by which a malicious manipulation of the bootstrap can be detected.

It is therefore an object of the present invention to provide protecting circuitry and code for detecting malicious manipulations within a bootstrap of a computerized device, by monitoring power consumption from the DC supply of the device.

It is another object of the present invention to provide said protecting code and circuitry for detecting malicious manipulations within a bootstrap of a computerized device in a manner which is fully isolated and protected from any external manipulation.

It is still another object of the invention to provide said protecting code and circuitry that can be applied to both stationary devices that are fed from a power supply and to mobile devices that are fed from a battery.

It is still another object of the invention to provide said protecting code and circuitry that can detect where and when along the stream of the bootstrapping the malicious manipulation has occurred.

Other objects and advantages of the invention will become apparent as the description proceeds.

SUMMARY OF THE INVENTION

The invention relates to a system for protecting a computerized device from activities within the device bootstrap, which comprises: (a) a DC supply monitoring unit for monitoring power consumption of the DC supply of the device during bootstrap; and (b) a database for storing one or more valid bootstrap signatures, each of said valid bootstrap signatures describes a valid variation of power consumption pattern, respectively, from the DC supply of the device; wherein, during bootstrapping of the device, said DC supply monitoring unit continuously monitors the power consumption from said DC supply of the device, compares characteristics of the power consumption with said one or more valid bootstrap signatures in said database, and alerts upon detection of a mismatch.

Preferably, said database further stores one or more invalid or malicous bootstrap signatures, each of said invalid or malicious bootstrap signatures describes invalid or malicous variation of power consumption pattern, respectively, from the DC supply of the device, and wherein during bootstrapping of the device, said DC supply monitoring unit continuously monitors the power consumption from said DC supply of the device, compares characteristics of the power consumption with said one or more valid and invalid bootstrap signatures in said database, respectively, and alerts upon detection of a mismatch or match, respectively.

Preferably, said signatures are created based on an offline learning process on a valid bootstrap pattern, said learning process involves running of the bootstrap pne or more times, use of pattern recognition or machine learning techniques.

Preferably, said DC supply monitoring unit is separated and isolated both physically and logically in terms of connectivity from the hardware and software of the computerized environment of the device, and wherein said DC supply monitoring unit is at most physically connected to the DC supply of the device.

Preferably, the system is positioned on a printed circuit which is separate both physically and logically from the electronic circuitry of said monitored computerized device, and wherein said system comprises a dedicated microprocessor on said separate printed circuit.

Preferably, said DC supply monitoring unit is positioned on a separate printed circuit, and wherein said microprocessor bases its monitoring on sampling of the current consumption from said DC supply.

Preferably, said DC supply monitoring unit forms a trusted execution environment which is at least logically separated from the main operating system of the device.

Preferably, said computerized device is a mobile device, and wherein said DC supply is the battery of the device.

Preferably, said computerized device is a stationary device, and wherein said DC supply is the DC power supply of the device.

Preferably, each of said valid bootstrap signatures comprises marks that are intentionally introduced to within the bootstrap code, each of said marks reflects a specific, known, and distinguishable shape of a signal in terms of power consumption from the DC supply.

Preferably, said comparison uses pattern recognition techniques or machine learning techniques.

Preferably, said alert is provided via a wired network interface.

Preferably, said alert is provided via a wireless network interface.

Preferably, said alert is provided by visual, audible, or a combination thereof.

Preferably, said alert in provided by alert means that are positioned within the separate printed circuit.

Preferably, said visual means is a light emitting diode, and said audible means is a speaker.

Preferably, said visual means is an external screen or touch screen.

Preferably, the form and manner of the alert may be selected from several levels of alerts.

Preferably, the monitoring of the power consumption from the DC supply is performed by means of sampling of current consumption.

Preferably, raw data resulting from the monitoring of the DC supply is transferred out via wired or wireless interface for the purpose of processing or furture analysis.

DETAILED DESCRIPTION OF PREFERRED EMBODIMENTS OF THE INVENTION

As noted above, all the typical security software that intends to protect a computerized environment from a malicious code runs some software from within the protected environment itself. This is also the case with Zefferer et. al (mentioned above) which suggests detection of malicious code by means of monitoring the power consumption of the mobile device by means of dedicated software. As also noted, this approach, i.e., the running of a security program from within the protected environment, has an inherent drawback, as the malicious code which has been successfully injected into the system may manipulate the security program itself, to either: (i) terminate its operation; (ii) cause it to ignore the existence of the malicious code within the protected environment; or (iii) manipulate the security program such that no report will be issued to the user with respect to the detection of the malicious code. Moreover, both Zefferer (whose monitoring code runs from within the computerized environment of the protected device), and PCT/IL2015/050297 (whose monitoring code runs outside of the computerized environment of the protected device) try to detect a malicious code during its execution. None of them suggests the detection of a malicious code or other events at its initiation stage during the bootstrapping stage of the device. Moreover, none of them suggests any manner for detecting a malicious manipulation or other events of the bootstrapping of the device.

Figure 1:
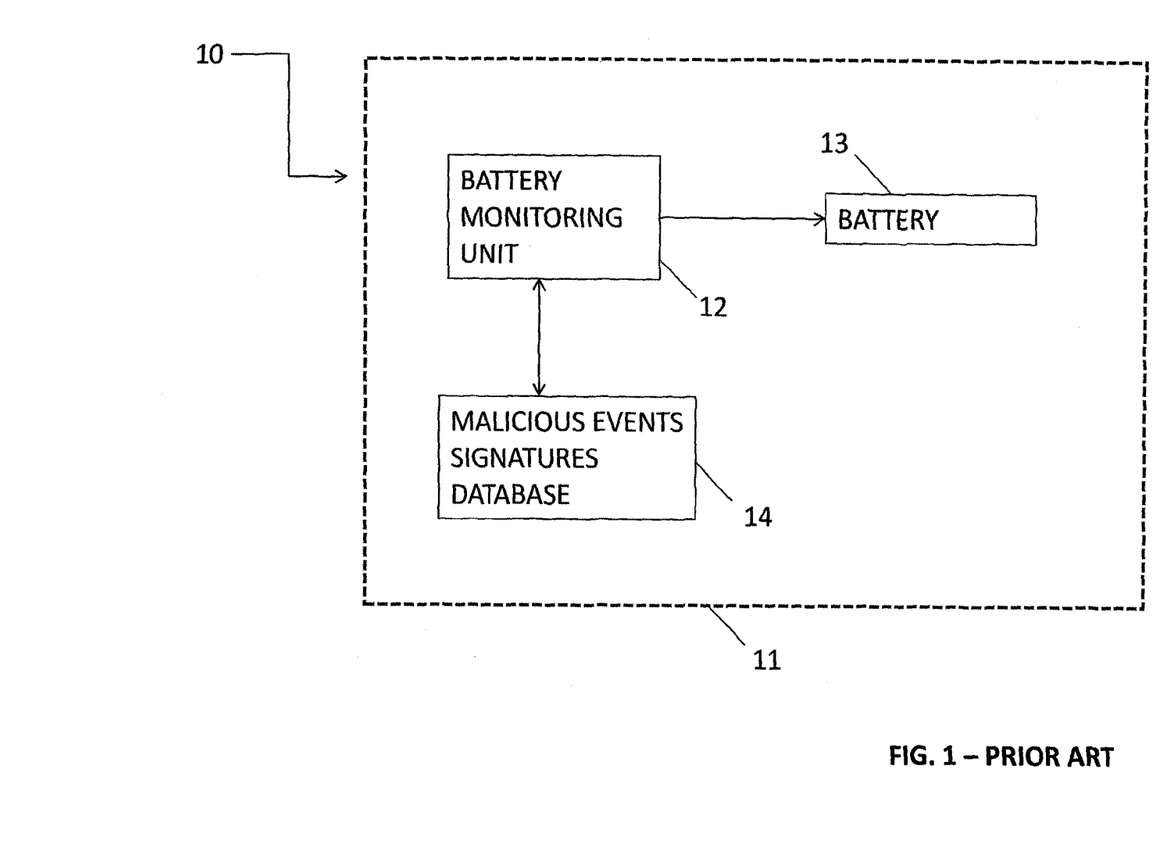
FIG. 1 illustrates in a simplified block diagram form a manner by which a prior art security system, such as a hypothetical system based on Zefferer et. al operates.

FIG. 1 illustrates in a simplified block diagram form the manner by which the prior art security system 10, such as a hypothetical system based on Zefferer operates. The protecting system 10 based on Zefferer typically operates by means of a running application to protect a computerized environment of 11 of a mobile device. Naturally, the running application operates from within the protected environment 11, i.e., by means of the microprocessor of the mobile device and from the same memory on which the operating system and all the other programs and applications run on the device. Therefore, and as noted above, this protecting system 10, having the form of a program, is susceptible to malicious manipulations. The system 10 comprises a software-based battery monitoring unit 12 which monitors the power consumption from battery 13 to detect battery consumption events. A battery consumption event may be considered as any change with respect to the power consumption from the battery 13. Upon detection of any of such event, the battery monitoring unit records the event characteristics, and compares these characteristics against each of the malicious code signatures (a "signature" is a pattern of battery consumption) that are stored within the malicious code signatures database 14. Upon finding of any match between the recorded event and a signature within the database, the monitoring unit issues an alert.

Figure 2:
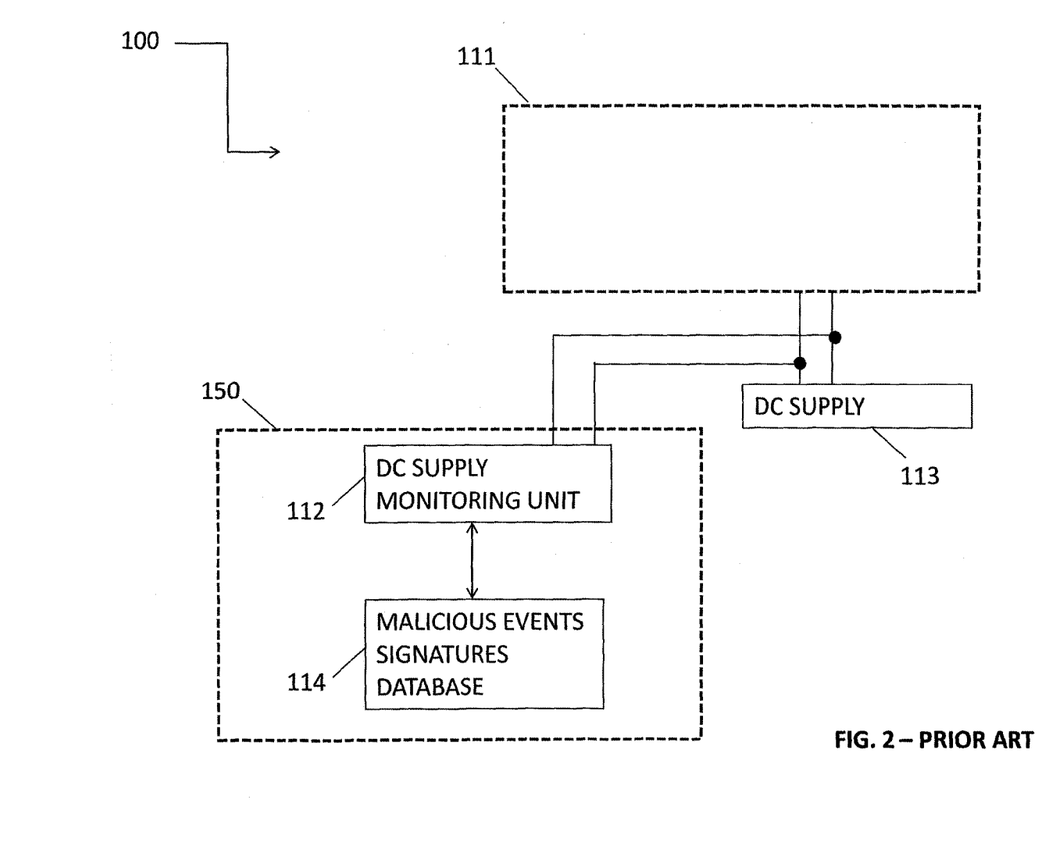
FIG. 2 shows in a simplified block diagram form a protecting system for protecting a computerized device (either mobile device, or a stationary device), according to an embodiment of PCT/IL2015/050297.

FIG. 2 shows in a simplified block diagram form a protecting system 100 for protecting a computerized device (either a mobile device or a stationary device), according to an embodiment of PCT/IL2015/050297. The environment 111 is the conventional computerized environment (hardware and software) of the device. The DC supply 113 may be either a battery of the mobile device or a DC power supply of a stationary device and it feeds, as is conventional, DC voltage to the hardware portion of the environment 111.

The DC supply monitoring unit 112 and the malicious events signatures database 114 are similar in their nature to the battery monitoring unit 12 and malicious events signatures 14 of FIG. 1, respectively, however they operate on a computerized environment 150 which is totally isolated from the computerized environment 111 of the device. More specifically, the battery monitoring unit 112 and the malicious events signatures database 114 are operated by a separate microprocessor (not shown) which is positioned on an individual printed circuit which is totally separated and isolated both physically and in terms of connectivity from both the hardware and software of the computerized environment 111 of the device. The DC supply 113 is shown external of the computerized environments 111 and 150, as the battery only feeds in parallel these two environments with DC voltage. However, there is no way whatsoever for interaction between these two environments 111 and 150, as they are totally separated and isolated one from the other both in terms of hardware physical separation and in terms of software separation.

According to the invention of PCT/IL2015/050297, the DC supply monitoring unit 112 which is totally separated and isolated from the computerized environment of the device also comprises alert means (not shown). Upon detection of a malicious event, the alert may be provided to the user, visually, audibly or both. The visual alert may be provided to the user, for example, by means of a light emitting diode, and the audible alert may be provided by means of a buzzer. In any case, all the means for providing said alerts are located on the printed circuit of environment 150, which is totally separated and isolated from the computerized environment 111 of the device. Furthermore, several levels of alert are provided, and these levels may be reflected either visually of audibly.

Figure 3:
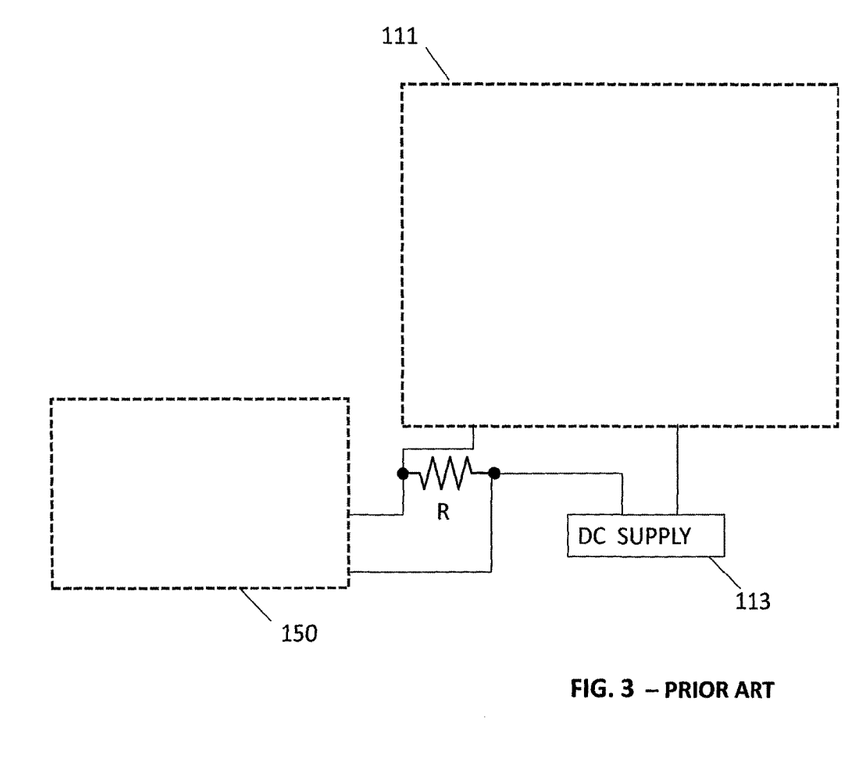
FIG. 3 illustrates the interconnections between a DC supply unit and two separate environments and, according to PCT/IL2015/050297.

FIG. 3 illustrates the interconnections between the DC supply unit 113 and the two separate environments 111 and 150, according to PCT/IL2015/050297. In principle the power consumption of the computerized environment 111 of the device can be analyzed by measuring the voltage and current of the device DC supply 113. In practice, the voltage of the DC supply is almost constant, so only the current provides significant data. Standard sampling equipment based on ADC (Analog to Digital Converter) can sample only voltage, so in order to measure the current a small series resistor R is connected to the DC supply output, ahead of the power socket, as shown in FIG. 3. In this arrangement, the sampled voltage is proportional to the current. There are two ways for the resistor R to be connected: to the positive electrode of the DC supply or to the negative (ground) electrode. If the resistor R is connected to the positive electrode, a differential amplifier for ADC (Analog to Digital Converter) is required. On the other hand if the resistor is connected to the negative electrode of the DC supply, a single end connection can do the work. The first connection is preferred due to its smaller amount of interferences. The sampling rate has to be at least two times larger than the maximum frequency of the sampled data (based on the Nyquist rate).

As noted above, PCT/IL2015/050297 teaches monitoring of the power consumption from a DC supply of the device, and detection of signatures of malicious codes during their execution, by comparing the currently monitored power consumption with malicious event signatures. PCT/IL2015/050297, however, does not suggest any means for monitoring and safeguarding the integrity of the bootstrap of the device.

As is well known, the bootstrap of the device is a procedure which is initiated one-time upon each power-on or reset of the device. Typically, the bootstrap code is stored within a flash memory, and is generally not supposed to frequently change in terms of its structure and in terms of its pattern of power consumption during its execution. The bootstrap in fact initiates basic legitimate programs on the device, and it is also known to be exploited by hackers that introduce into it initiation of malicious programs, or it is manipulated in any other malicious manner.

The present invention preferably uses an isolated circuitry and monitoring code as in FIGS. 2 and 3 (i.e., in similarity to the one used in PCT/IL2015/050297 with modifications that will be elaborated hereinafter), however, it may also use a monitoring code that runs from within the same computerized environment of the device as shown in the prior art embodiment of FIG. 1 (also with some modifications). However, in contrast to the prior art in which the power consumption is checked with respect to the running stage of a malicious code, the present invention checks irregularities in the pattern of the power consumption by the bootstrap.

It has been found by the inventors that each specific bootstrap has a relatively constant pattern, respectively, in terms of the device power consumption during its execution time. More specifically, while monitoring the power consumption of the DC supply, the same pattern is in fact repeated each time that the bootstrap is performed. There may be some variations between boot-ups, however, these variations are relatively constant, and can be foreseen and taken into account. In one example, the boot-up may act in one specific pattern when a printer is ON (while the boot-up tries to initiate the printer), or in a different pattern when the printer is OFF (and there is no printer to initiate). In another example, a boot-up of a device which initiates one or more turbines in an industry may act somewhat different each time, depending on the time it takes to initiate each of the turbines. However, these differences that may occur are relatively constant and can also be foreseen.

Figure 4A:
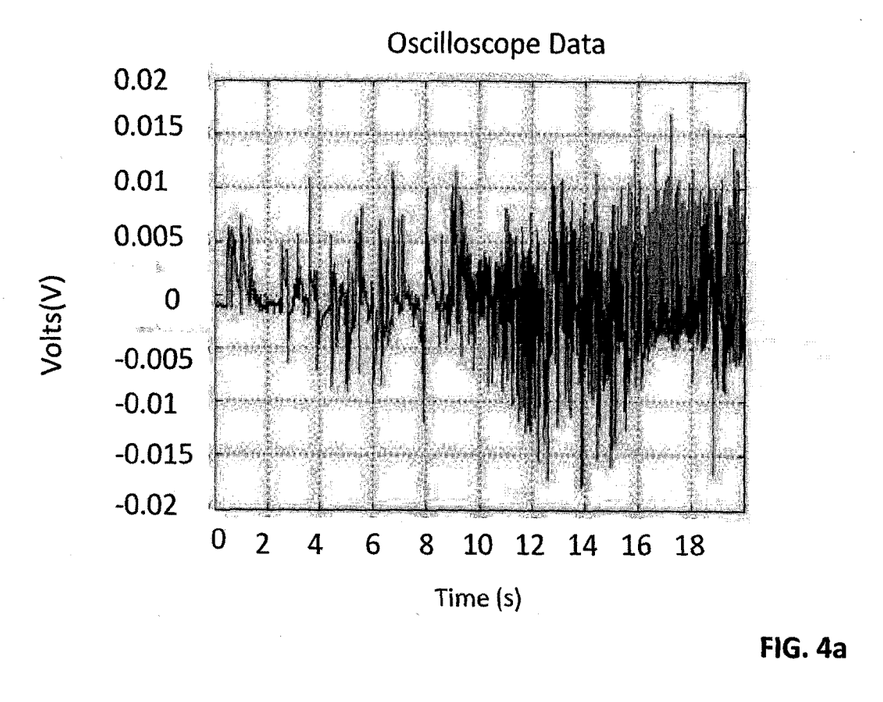
FIG. 4a shows a typical pattern of power consumption from a DC supply during boot-up, as occurs by one version of bootstrap on one specific device.
Figure 4B:
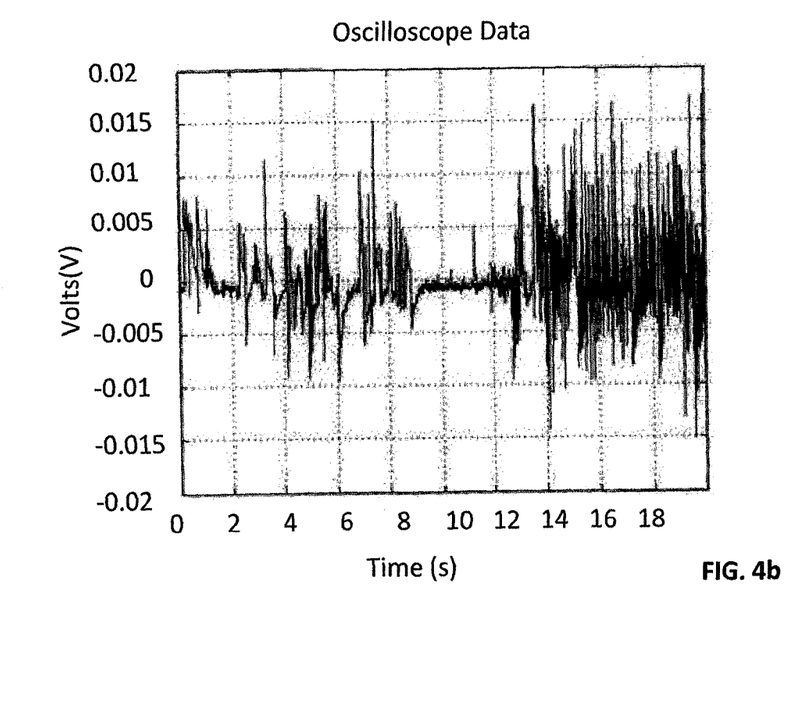
FIG. 4b shows the power consumption in the same device as of FIG. 4a, while another version of the bootstrap runs on the device.

For example, FIG. 4a shows a typical pattern of power consumption from the DC supply during boot-up, as occurs by one version of bootstrap on one specific device. FIG. 4b shows the power consumption in the same device, while another version of the bootstrap runs on the same device. It can be seen that the differences between these two patterns are observable, and can be easily detected. Therefore, and for this reason, upon manipulation of the bootstrap it is expected that observable and distinguishable differences will be detected.

Figure 5:
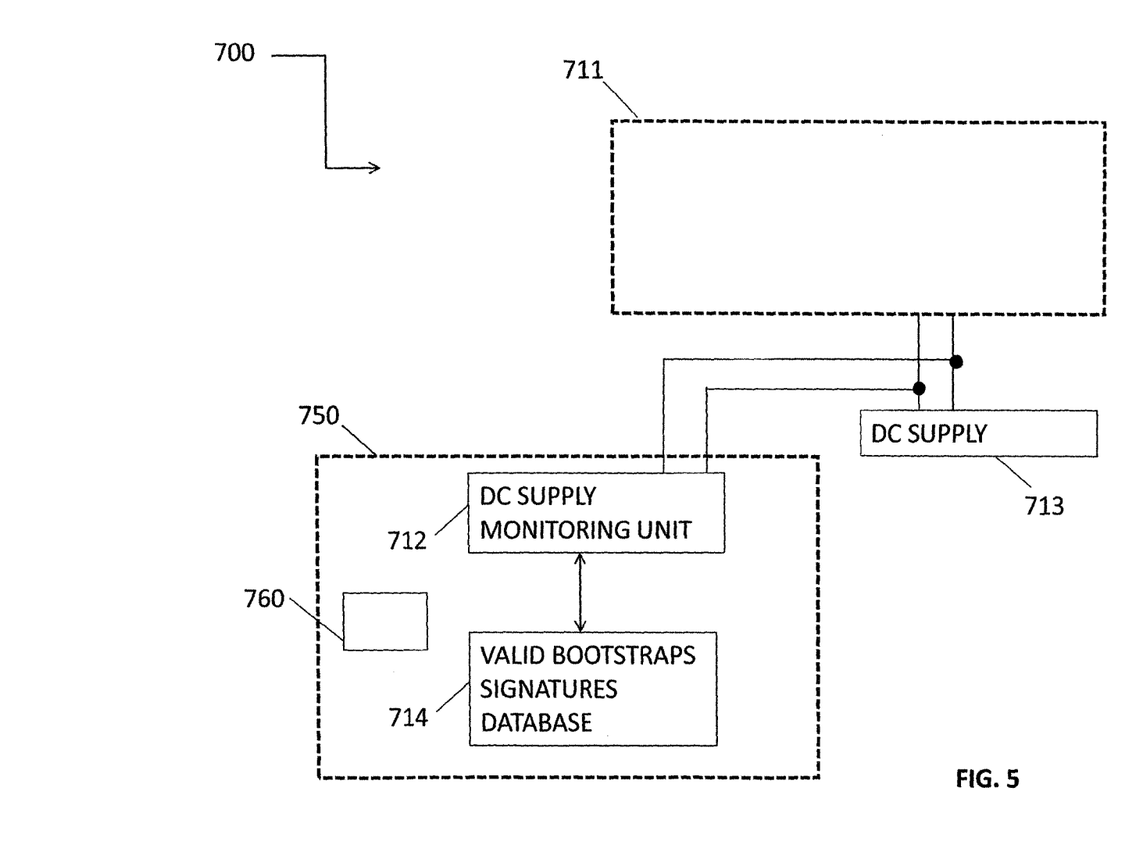
FIG. 5 shows the in a general block diagram form the general structure of a bootstrap monitoring system according to an embodiment of the invention.

FIG. 5 shows the in a general block diagram form the general structure of a bootstrap monitoring system according to an embodiment of the invention. The structure of the system is similar to the structure of the prior art system of FIG. 2, however, while in the system of FIG. 2 the unit 114 is a "malicious events signatures database" (i.e., it stores signatures of malicious events running within the device in terms of their power consumption), the unit 714 in the system of the present invention as in FIG. 5 includes "valid bootstraps signatures database". More particularly, the unit 714 contains one or more signatures of valid bootstraps. More specifically, the unit 714 includes one or more signatures relating to valid variations of the existing bootstrap in terms of power consumption. During bootstrap, the monitoring unit 712 monitors the progress of the power consumption, and compares its pattern with one or more of the valid bootstrap patterns that are stored in the database 714. Each signature in the database 714 reflects one valid variation (scenario) that may exist, depending on the specific situation, for example, and in reference to the two non-limiting examples above, different signatures may be provided for situations in which a printer is connected to the device or not, to situations in which one or more turbines are initiated during bootstrap, etc. In any case, and as noted, the variations to the bootstrap are typically relatively constant, and can be foreseen, so specific valid bootstrap signatures may be prepared and stored in database 714 in advance.

The signatures of the valid bootstrap (or variations thereof) are determined in advance, and then stored within database 714. The stored signatures are in fact some representation, respectively, of the bootstrap in terms of power consumption from the DC source. In one example, a bootstrap signature comprises the samples that represent the current consumption during the bootstrap period (the sampling frequency may be determined according to a desired resolution). The manner by which the power consumption is determined during bootstrap is substantially the same as described with respect to FIG. 3. The comparison between the available signatures and the running bootstrap may use either machine learning or pattern recognition techniques (that may use correlation), in manners well known in the art.

The bootstrap monitoring system of FIG. 5 is preferably positioned on a separate printed circuit, which forms a separate computerized environment 750 which is logically and physically isolated from the computerized environment 711 whose bootstrap is monitored. This separate circuit comprises a separate microprocessor 760 which controls all the operations of the bootstrap system.

In a preprocessing (off line) stage, the microprocessor 760 learns the valid pattern of the monitored bootstrap of the computerized system 711. This process may involve one or more repetitions, recordings, inspections, and charactristics extractions from said bootstrap. For this purpose, the microprocessor 760 applies a machine learning and/or pattern recognition techniques. This pre-processing stage results in the valid bootstrap signatures that are then stored within the valid bootstraps signatures database 714. As said, the signatures represent characteristics of the entire bootstrap, or portions thereof. During real time operation, the microprocessor 760 operates the DC supply monitoring unit 712 to perform the monitoring of the running bootstrap in terms of power consumption and comparison with the valid bootstraps signatures that are stored in database 714.

Microprocessor 760 is also responsible for the initiation of alerts (or any other predefined action, such as, for example, turning-off of the monitored computerized environment 711), upon detection of a mismatch by the monitoring unit 712. In still another embodiment, the valid bootstraps signatures database 714 may also comprize signatures of invalid-corrupted bootstraps, whose corruption is known to be originated from known malicious activities. In such a manner, the monitoring unit 712 may try to match between the running bootstrap and said known invalid signatures to detect not only a corruption, but also the specific malicious code that caused this corruption.

In still another option, the microprocessor 760 may create and store logs with respect to the results of the monitoring operation. Microprocessor 760 may also output said logs and results to an external unit, using, for example, wired means (such as via a USB port—not shown), or wirelessly.

In one variation of the invention, while preparing the bootstrap signatures, one or more known malicious programs may be intentionally added to the bootstrap in order to test and inspect their respective effects on the valid bootstrap, and in order to assure when such malicious programs will be added with no authorization to the real bootstrap, they will be distinguished and detected.

In still another variation of the invention, one or more specific "marks" are intentionally added to the valid bootstrap. A "mark" may reflect a short period of power consumption having specific, known, and distinguishable signal shape. For example, in a 60 seconds bootstrap, marks may be added, for example, every 10 seconds, or at specific locations along the bootstrap process. Thereafter, and during bootstrap, when an irregular pattern (discrepancy) is observed by the monitoring unit 712 within the bootstrap pattern, the location of the irregular pattern along the bootstrap code process can be determined. More specifically, a location of a discrepancy in a power consumption (compared to the expected as reflected by the bootstrap signature), together with the "marks", provide a hint as to where in the bootstrap code the discrepancy occurred. This hint may serve as a debugging tool for detecting, correcting, and eliminating the discrepancy. As previously noted, such an irregular pattern may be a sign for an unauthorized manipulation of the bootstrap.

In still another variation of the invention, the monitoring unit 712 may ignore several specific portions of the bootstrap pattern.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A system for protecting a computerized device from activities within a device bootstrap, which comprises:
   a) a DC supply monitoring unit for monitoring power consumption of a DC supply of the device during bootstrap; and
   b) a database for storing one or more valid bootstrap signatures, each of said valid bootstrap signatures describes a valid variation of power consumption pattern, respectively, from the DC supply of the device;
   wherein, during bootstrapping of the device, said DC supply monitoring unit continuously monitors the power consumption from said DC supply of the device, compares characteristics of the power consumption with said one or more valid bootstrap signatures in said database, and alerts upon detection of a mismatch;
   wherein said DC supply monitoring unit is separated and isolated both physically and logically in terms of connectivity from hardware and software of a computerized environment of the device, and wherein said DC supply monitoring unit is at most physically connected to the DC supply of the device.

2. The system according to claim 1, wherein said database further stores one or more invalid or malicious bootstrap signatures, each of said invalid or malicious bootstrap signatures describes invalid or malicious variation of power consumption pattern, respectively, from the DC supply of the device, and wherein during bootstrapping of the device, said DC supply monitoring unit continuously monitors the power consumption from said DC supply of the device, compares characteristics of the power consumption with said one or more valid and invalid bootstrap signatures in said database, respectively, and alerts upon detection of a mismatch or match, respectively.

3. The system according to claim 1, wherein said signatures are created based on an offline learning process on a valid bootstrap pattern, said learning process involves running of the bootstrap one or more times, and use of pattern recognition or machine learning techniques.

4. The system according to claim 1, which is positioned on a printed circuit which is separated both physically and logically from electronic circuitry of said monitored computerized device, and wherein said system comprises a dedicated microprocessor on said separated printed circuit.

5. The system according to claim 1, wherein said DC supply monitoring unit is positioned on a separate printed circuit, and wherein said microprocessor bases its monitoring on sampling of a current consumption from said DC supply.

6. The system according to claim 1, wherein said DC supply monitoring unit forms a trusted execution environment which is at least logically separated from a main operating system of the device.

7. The system according to claim 1, wherein said computerized device is a mobile device, and wherein said DC supply is a battery of the device.

8. The system according to claim 1, wherein said computerized device is a stationary device, and wherein said DC supply is a DC power supply of the device.

9. The system according to claim 1, wherein each of said valid bootstrap signatures comprises marks that are intentionally introduced to within a bootstrap code, each of said marks reflects a specific, known, and distinguishable shape of a signal in terms of power consumption from the DC supply.

10. The system according to claim 1, wherein said comparison uses pattern recognition techniques or machine learning techniques.

11. The system according to claim 1, wherein said alert is provided via a wired network interface.

12. The system according to claim 1, wherein said alert is provided via a wireless network interface.

13. The system according to claim 1, wherein said alert is provided by visual means, audible means, or a combination thereof.

14. The system according to claim 4, wherein said alert is provided by alert means that are positioned within said separated printed circuit.

15. The system according to claim 13, wherein said visual means is a light emitting diode, and said audible means is a speaker.

16. The system according to claim 13, wherein said visual means is an external screen or touch screen.

17. The system according to claim 1, wherein a form and manner of the alert may be selected from several levels of alerts.

18. The system according to claim 1, wherein the monitoring of the power consumption from the DC supply is performed by means of sampling of current consumption.

19. The system according to claim 1, wherein raw data resulting from the monitoring of the DC supply is transferred out via wired or wireless interface for a purpose of processing or future analysis.

* * * * *